United States Patent [19]

Kranz

[11] Patent Number: 4,691,876

[45] Date of Patent: Sep. 8, 1987

[54] BRAKE AND RELEASE APPARATUS FOR A ROTARY NOZZLE BODY

[75] Inventor: Walter Kranz, Taufkirchen, Fed. Rep. of Germany

[73] Assignee: Messerschmitt-Bölkow-Blohm GmbH, Munich, Fed. Rep. of Germany

[21] Appl. No.: 870,501

[22] Filed: Jun. 4, 1986

[30] Foreign Application Priority Data

Jun. 4, 1985 [DE] Fed. Rep. of Germany ....... 3519892

[51] Int. Cl.$^4$ .......................................... F42B 15/033
[52] U.S. Cl. .................................................. 244/3.22
[58] Field of Search ........................ 244/3.22; 60/230; 239/265.11, 265.19

[56] References Cited

U.S. PATENT DOCUMENTS

| 4,463,921 | 8/1984 | Metz | 244/3.22 |
| 4,573,648 | 3/1986 | Morenus et al. | 244/3.22 |
| 4,589,594 | 5/1986 | Kranz | 244/3.22 |

Primary Examiner—Charles T. Jordan
Attorney, Agent, or Firm—Kenyon & Kenyon

[57] ABSTRACT

A brake and release means for a rotary nozzle body. The rotating shaft of the nozzle body is mounted in a missile casing and delivers a gas thrust jet substantially perpendicularly to the direction of the longitudinal axis of the missile for guiding the missile. To be able to adjust the angular position between the rotary nozzle body and missile with high control frequency and exactly, a brake and release device is provided which comprise a friction coupling and an electromagnetic setting means. The frictional engagement and the release of the rotary nozzle body occur through a force control in that through the setting means, a control force axially directed counter to the tensioning force which assures the frictional engagement is exerted on the rotary nozzle body. To support the release of the rotary nozzle body, it may be provided further to build up a gas pressure between the friction faces of the friction coupling.

15 Claims, 7 Drawing Figures

BRAKE AND RELEASE APPARATUS FOR A ROTARY NOZZLE BODY

BACKGROUND OF THE INVENTION

The present invention relates to a brake and release apparatus for a rotary nozzle body.

In German patent application DE-OS 33 17 583 owned by the assignee of the present application, a device for the control of a fast flying missile is described which comprises a rotary nozzle body rapidly rotating about the longitudinal axis thereof having at least one thrust nozzle pointing in the ejection direction. The rotary nozzle body is driven continuously about an axis approximately perpendicular to the ejection direction by the gas stream of a gas source, e.g., a gas generator. This is achieved, for example, in that the rotary nozzle body has at least one thrust nozzle whose thrust direction does not go through the axis of rotation of the rotary nozzle body. The position of the rotary nozzle body relative to the missile casing can be adjusted by a brake and release device in the manner of a friction coupling or clutch. Depending on this relative angle position, the thrust vector of the thrust jet points in a certain direction in space, whereby a control force is exerted on the missile. The friction coupling comprises a friction disk fastened to the missile, a co-rotating coupling disk connected to the notary nozzle body, and on the side of the missile, a pressure disk, the position of which can be adjusted by means of an electromagnet in such a way that either the coupling disk of the rotary nozzle body is clamped between the missile-side friction disks or can rotate freely between them.

This known device for the guiding of missiles can be miniaturized to a high degree. In addition, through the continuously drivable fast rotating rotary nozzle body, in principle, a very rapid change of command, i.e., change of the thrust jet from one to another direction in space, can be obtained. The thus attainable control frequency for the command changes is limited essentially by the response sensitivity and accuracy of the brake and release device.

SUMMARY OF THE INVENTION

It is an object of the present invention to simplify the design of the brake and relase device and to perfect it so that the control frequency for the rotary nozzle body can be increased appreciably.

According to the present invention, this problem is solved by a brake and release device for a rotary nozzle body whose rotary shaft is mounted in a missile casing and which for guiding the missile delivers a gas thrust jet substantially perpendicular to the direction of the axis of rotation, where for adjusting the thrust jet direction a friction coupling is provided which has on the side of the rotary nozzle body friction faces coupled to the latter, and corresponding friction faces on the side of the missile, which can be brought in and out of engagement with one another through a setting means, the friction coupling comprising a first friction face on the rotary nozzle body and a second friction face on the missile, wherein, when the setting means is not actuated, the nozzle-side friction face is held in frictional engagement with the missile-side friction face by a tensioning force, the setting means acting on the rotary shaft of the rotary nozzle body when actuated through a thrust/pivot bearing and furnishing an actuating force directed counter to the tensioning force.

Accordingly, when the brake and release device is not actuated, a frictional engagement between the rotary nozzle body and the missile casing is maintained by a tensioning force acting on the rotary nozzle body. This tensioning force can be supplied very simply by the gas stream delivered, e.g., by a gas generator, which pushes the rotary nozzle body and hence its friction face in an axial direction against the missilefastened friction face. The setting means, which is actuated preferably electromagnetically, acts through a thrust/pivot bearing directly on the rotary shaft of the rotary nozzle body and furnishes, when the brake and release device is actuated, an actuating force opposed to the tensioning force, which reduces the frictional engagement at least to the extent that a rotational movement of the rotary nozzle body can take place. If the actuating force is removed, the rotary nozzle body becomes motionless.

The invention makes the coupling disk in the known brake and release device superfluous, so that the moment of inertia of the rotating system is reduced considerably, at equal overall size, for instance, to two thirds the known value. Likewise a higher rotary acceleration of the rotary nozzle body is obtained, thereby ultimately improving the dynamic performance of the system.

Another advantage of the device according to the invention is the deceleration of the rotary nozzle body at its end face, that is, almost directly in the region in which the torque for the rotary nozzle body is generated. Thereby, during extremely rapid decelerations, almost no torsion forces are transmitted to the bearing axle of the rotary nozzle body, which thus does not absorb any rotational forces or torques.

The operation of the brake and release device can be improved by arranging between the ground (polished) friction faces of the rotary nozzle body and missile an annular space acting as a pressure accumulator. This annular space is provided as a pressure accumulator in one of the two friction faces, preferably in the missile-side friction face, and communicates with a propellant or gas source. In the simplest case the gas source is the gas generator with which the rotary nozzle body itself is set in rotation. Via at least one opening the gas of the gas generator fills the annular space or annular channel and acts on the rotary nozzle body contrary to the normal tensioning force. The tensioning force as a whole is thereby reduced, and hence also the required actuating force for release of the rotary nozzle body. The result is that the actuating force supplied by the setting means, that is, in an electromagnetic setting means, the required electrical energy, can be reduced. In addition, the size of the electromagnet coils can thereby be reduced. Another advantage resides in the relief of the magnet system of the setting means at different gas pressure during operation, as the tensioning force is increased or decreased in proportion to the gas pressure of the gas generator, but also the counter-force acting on the rotary nozzle body due to the pressure in the annular space is changed proportionally in accordance therewith.

In one embodiment of the invention, the annular channel is dimensioned so that when the setting means is deactivated, the frictional engagement between the friction faces of the rotary nozzle body and the missile is reliably maintained.

In another embodiment of the invention, the annular space acting as a gas storage space, with its feed lines, is dimensioned so that by the counter-force acting on the rotary nozzle body, the frictional engagement is overcome and the rotary nozzle body rotates. Now if in certain rotational positions of the rotary nozzle body the annular space or annular channel has outlet openings communicating to the outside, the gas storage space will, in these certain rotational positions, be evacuated through these outlet openings. At this moment the full tensioning force again acts on the rotary nozzle body, so that the frictional engagement is restored and the rotary nozzle body brakes abruptly. In these certain rotational positions no pressure is built up in the annular space by the throttle effect of the feed channel, as the propellant or gas moving up into the annular space is immediately ejected through the outlet openings leading to the outside.

If now the setting means is actuated, namely with an actuating force which overcomes the total tensioning force, the rotary nozzle body begins to rotate out of the specific rotational position. The outlet openings are thereby covered up, so that the annular space closes itself off from the outside. As a result, the rotary nozzle body continues to rotate due to the counter-force building up in the annular space until, in a new specific rotational position, the annular channel is evacuated through an outlet opening and the rotary nozzle body is abruptly braked. An essential point here is that the setting means, e.g., the electromagnet, can be deactivated again immediately after initiation of the rotary acceleration of the rotary nozzle body. Thus an extremely fast stepping of the rotary nozzle body is possible, which is initiated by a short pulse of the setting means, e.g., a short electric pulse of the electromagmet. In the case of an electromagnetic setting means this allows small magnet coils having low electric power requirements to be used. The load of the magnet coil and therefore the heat development thereof are reduced also.

According to a further embodiment of the invention, the outlet ports, opening into open space, of the annular channel acting as the gas storage space, can be controlled shut, e.g., electromagnetically with the aid of an electromagnet of the setting means. This effect can be utilized for a precontrol. The gas pressure building up in the annular space in this case reduces the required actuating force. The positive pressure in the annular space can also be used to separate the friction faces, until, for example, the gas leaves the annular space via the friction faces themselves to the outside. Thus, despite the positive pressure, in the last analysis the axial movement of the rotary nozzle body and its axial position in the direction of the gas generator have remained limited to a certain amount.

The fundamental advantage of the invention is the triggering of the braking or deceleration of the rotary nozzle body and its release practically without movement of the elements participating therein, i.e., in particular, of the magnet armature in an electromagnetic setting means and of the rotary nozzle body itself. Inertia effects are thereby virtually eliminated. Also, the friction moment of the friction coupling, though disturbing in itself, is utilized for the control of the rotary nozzle body in a defined manner.

BRIEF DESCRIPTION OF THE DRAWINGS

The invention will be explained in greater detail in the following description with reference to the drawings, in which.

DETAILED DESCRIPTION

Figure 1:
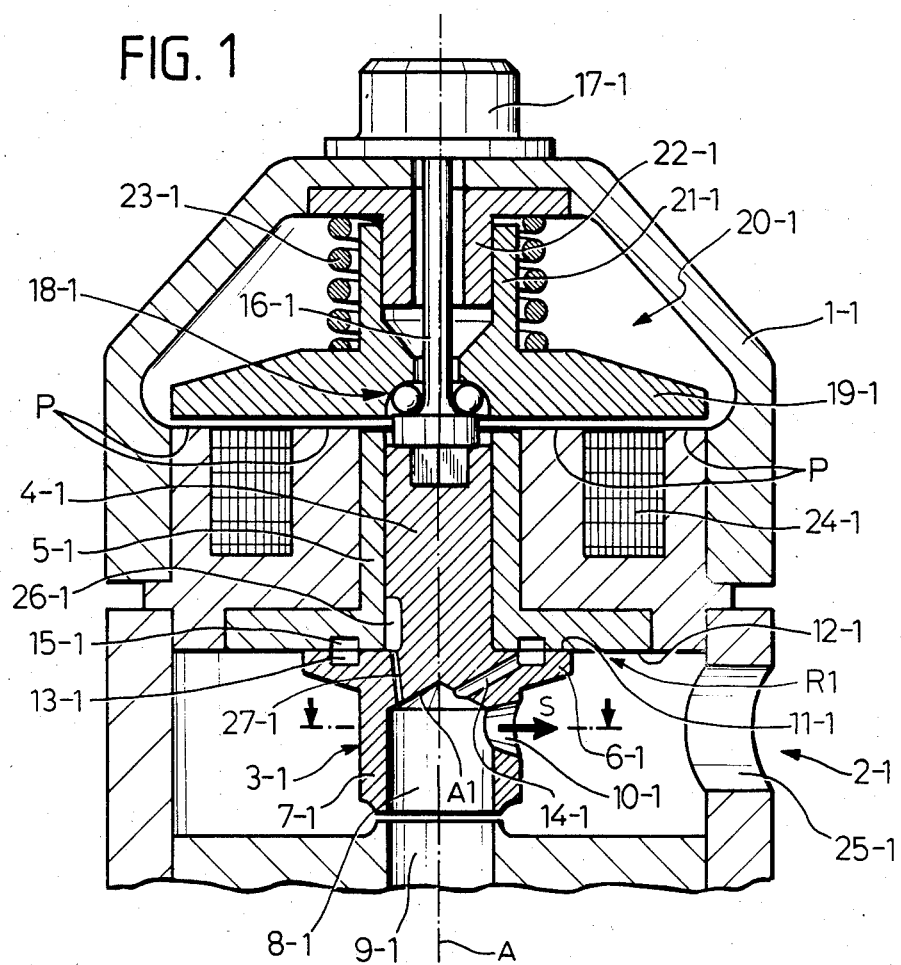
FIG. 1 is a transverse section through a part of a missile nose with a rotary nozzle body for missile control and with a brake and release means for the rotary nozzle body according to a first embodiment of the invention.
Figure 1A:
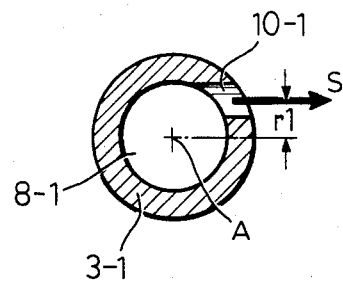
FIG. 1a is a transverse section through the rotary nozzle body according to FIG. 1.

With reference now to the drawings, FIG. 1 shows the nose of a projectile, in this case of a fast flying shell 1-1, which is guided with the aid of a thrust nozzle system 2-1. The thrust nozzle system comprises a rotary nozzle body 3-1, which by an upper neck portion 4-1 is mounted in a bearing sleeve 5-1 of the missile for rotation about the longitudinal axis A thereof. Contiguous to the neck portion 4-1 of the rotary nozzle body are, as viewed downward in FIG. 1, a flange 6-1 and a fuselage portion 7-1. In its outer contours the rotary nozzle body 3-1 is rotation-symmetrical. In the fuselage portion 7-1 a central bore 8-1 is arranged, which communicates with a missile side bore 9-1, which in turn leads to a gas generator not shown. From the central bore 8-1, an acentric thrust nozzle 10-1 branches off, whence the gas jet of the gas generator emerges, creating a thrust S. The thrust nozzle is disposed so that the thrust vector S does not pass through the axis of rotation A, so that there is exerted on the rotary nozzle body a torque corresponding to the product of the thrust S and the distance rl of this vector from the axis of rotation, see FIG. 1a.

The flange 6-1 abuts on its flat ground face 11-1 turned toward the neck portion 4-1 against a similar missile-side friction face 12-1, the two together forming a friction coupling R1. When the gas generator burns down, the gas stream presses on the upper limiting face A1 of the central bore 8-1 and thereby presses the friction face 11-1 of the rotary nozzle body against the missile-side friction face 12-1. The gas pressure and the dimensions of the friction faces 11-1 and 12-1 are dimensioned so that despite the torque acting through the thrust jet S on the rotary nozzle body 3-1, the latter is retained in its rotating position, that is, frictional engagement prevails between the friction faces 11-1 and 12-1.

In the friction face 11-1 of flange 6-1 is provided further an annular channel 13-1 which communicates with the central bore 8-1 in the rotary nozzle body 3-1 through one or more tap bores 14-1. Directly above this annular channel 13-1, an annular channel 15-1 may be provided also in friction face 12-1. Due to the connection of the two annular channels 13-1 and 15-1 with the central bore 8-1, there acts between the two friction faces 11-1 and 12-1 a force in opposite direction to the tensioning force which by the gas pressure on the upper limiting face A1 retains the rotary nozzle body 3-1 in frictional engagement relative to the shell 1-1. This counter-force, therefore, must be smaller than the tensioning force.

Figure 5:
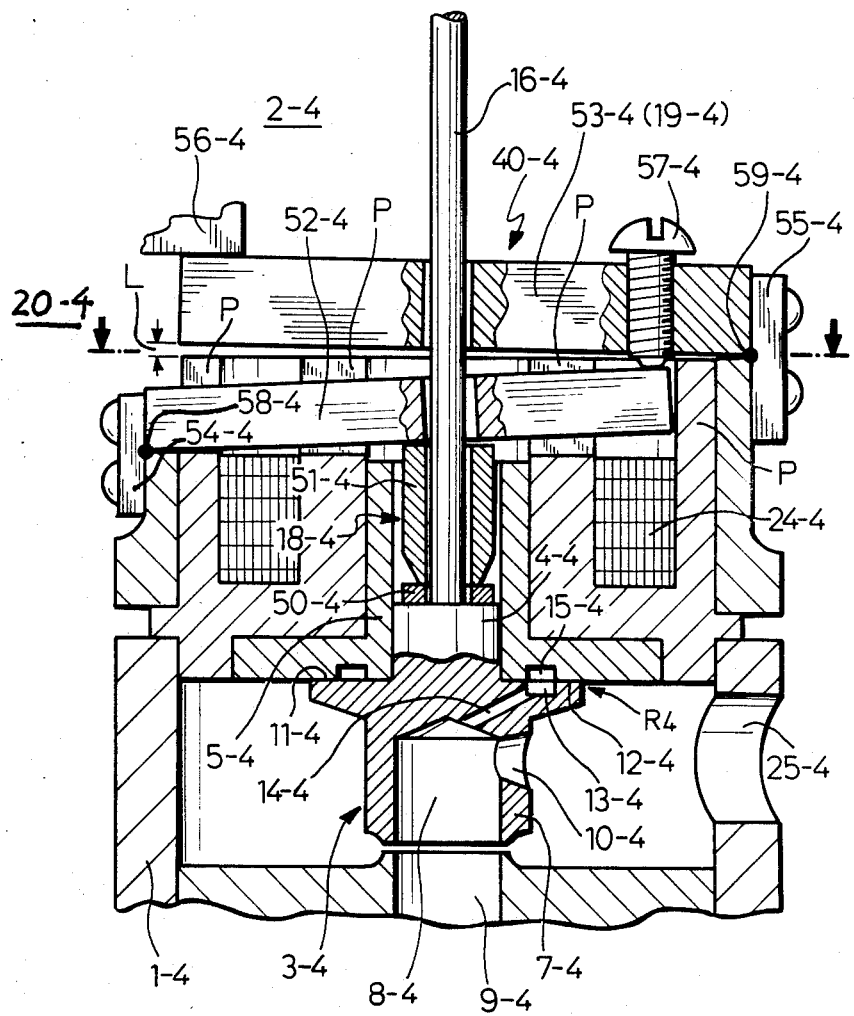
FIG. 5 is another embodiment of a brake and release device for a rotary nozzle body with an electromagnetically actuated folded lever drive as the setting means.

The upper end of the neck portion 4-1 toward the nose of the shell is connected by a shaft 16-1 of an angle transmitter 17-1, which is fastened at the head of the shell 1-1 and indicates the relative angle position between the rotary nozzle body 3-1 and the casing of the shell 1-1. This shaft 16-1 is mounted by a thrust/pivot bearing 18-1 in a magnet armature 19-1 which is part of a setting means 20-1 for the thrust nozzle system 2-1. By a thrust/pivot bearing is to be understood here and in the following a bearing which can transmit axial forces without substantially inhibiting the rotation of the rotating part. Thrust/pivot bearings may be ball bearings (in a limited extent), roller bearings or also sliding bearings (FIG. 5). The armature 19-1 has a T-shaped cross-section and is mounted with its sleeve type T shank 21-1 on a missile-fastened sliding sleeve 22-1 in a sliding fit. The armature is pressed against the neck portion 4-1 of the rotary nozzle body 3-1 by a tensioning spring 23-1.

Accordingly, the frictional engagement between the friction faces 11-1 and 12-1 is determined by the gas pressure onto the upper limiting face A-1 and by the oppositely directed forces inside the annular space 13-1, 15-1 as well as by the likewise oppositely directed spring force of the tensioning spring 23-1.

For the magnet armature 19-1 an electromagnet is provided having a magnet coil 24-1 which is arranged annularly around the axis A and which in accordance with a control circuit, not shown, is connected and disconnected in dependence on the signals of the angle transmitter 17-1. The poles of the electromagnet are indicated by P.

For the individual parts of the thrust nozzle system 2-1 illustrated in FIG. 1 let it be assumed that the magnet coil 24-1 is disconnected, so that the rotary nozzle body 3-1 is retained relative to the casing of the shell 1-1. The thrust jet S issuing from the thrust nozzle 10-1 passes into open space through ejection slits 25-1 in the casing of the shell 1-1, so that a guiding moment, counter-clockwise in FIG. 1, acts on shell 1-1. The shell can be controlled by varying the direction of the guiding moment. Also, a zero command is possible, where the thrust jet does not develop any transverse forces acting on the shell. Concerning this, reference is made specifically to the above-mentioned DE-OS 33 17 583.

If the angle position between rotary nozzle body 3-1 and the shell casing is to be changed, the magnet coil 24-1 is connected. An attracting force thereby is exerted on the magnet armature 19-1. The magnet armature 19-1 transmits this magnetic force via the thrust pivot bearing 18-1 to the rotary nozzle body 3-1. The magnetic force is rated so that thereby the above-mentioned tensioning force is overcome, so that the rotary nozzle body 3-1 is set in rapid rotation by the thrust jet S. When the magnet coil is disconnected again, frictional engagement again results between the friction faces 11-1 and 12-2, i.e. the rotary nozzle body 3-1 is retained relative to the casing of shell 1-1.

The above-mentioned tensioning force between the two friction faces 11-1 and 12-1 can further be influenced by the magnet coil receiving a constant small current. The rotary nozzle body 3-1 is then not released for rotation until the coil current exceeds this minimum current.

On the side radially opposite the thrust nozzle 10-1 there is provided further, in the neck portion 4-1 of the rotary nozzle body 3-1, a gas space 26-1 which communicates with the central bore 8-1 through a tap channel 27-1. Thereby the tilting moments acting on the rotary nozzle body 3-1 through the thrust jet S are compensated. If there are several thrust nozzles, several such gas spaces are provided accordingly.

Figure 2:
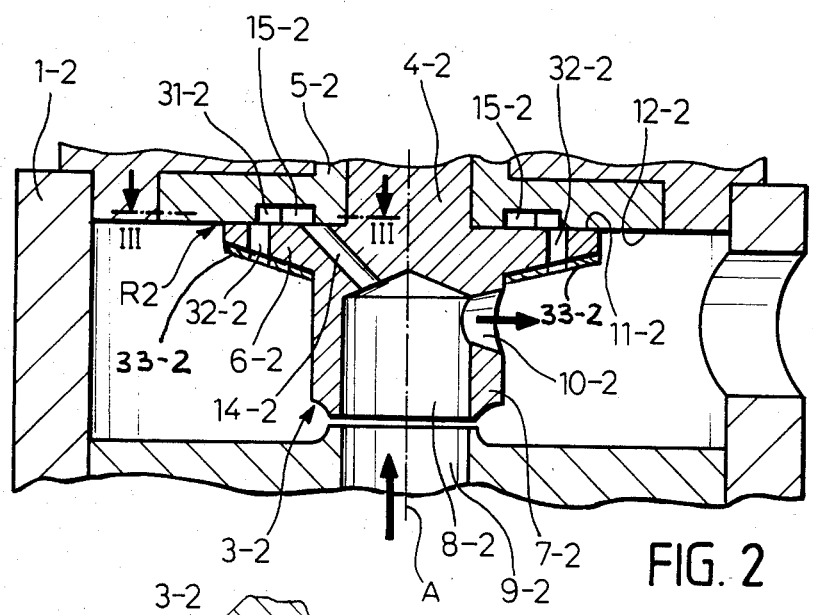
FIG. 2 is a partial transverse section through a second embodiment of a brake and release device according to the invention with a rotary nozzle body adjustable in defined angular steps.

In FIG. 2, a modified thrust nozzle system 2-2 is illustrated, wherein the rotary nozzle body 3-2 can be adjusted in defined angle steps in the manner of a step motor. In all essential points regarding the rotary nozzle body and setting means the thrust nozzle system resembles the embodiment according to FIG. 1 and is modified only in the region of the friction faces 11-2 and 12-2 of the friction coupling R2.

The tap bore 14-2 starting from the central bore 8-2 in the rotary nozzle body 3-2 opens with a certain overlap into an annular channel 15-2 which is cut in the missile-side friction face 12-2.

Figure 3:
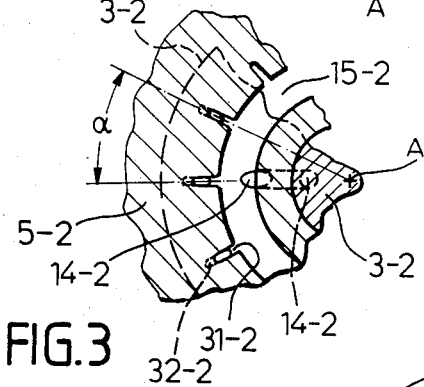
FIG. 3 is a section along line III—III of FIG. 2.

Radial slits 31-2 extends outward from this annular channel 15-2 at certain regular angle distances alpha, which slits communicate with exit slits 32-2 likewise arranged in certain angular steps inside flange 6-2 of the rotary nozzle body 3-2. According to FIG. 3, the angle distance of the individual exit slits 32-2 is equal to that of the radial slits 31-2. A different configuration is possible, e.g. for adjustment of the step angle. In the configuration shown in FIG. 3, the gas introduced into the annular channel 15-2 from the gas generator via the central bore 8-2 is conducted via the outlet slits 32-2 into the open. In this position no gas pressure builds up in the annular channel 15-2, or only a slight gas pressure which is determined by the pressure drop between the central bore 8-2 and the outlet slits 32-2. In any case, the separating force thereby acting between the friction faces 11-2 and 12-2 is smaller than the tensioning force acting on the rotary nozzle body in all. Thus, the rotary nozzle body is held in frictional engagement fixed relative to the casing of the shell 1-2. If now the setting means not shown is connected, the tensioning force is overcome, as described above, and the rotary nozzle body begins to rotate. By this rotation the outlet slits 32-2 are covered and, as described above, a gas pressure builds up between the friction faces 11-2 and 12-2. The difference from the above embodiment consists in that the separating force betwen the friction faces 11-2 and 12-2 exerted by the gas force is greater than the total tensioning force acting on the rotary nozzle body 3-2. Therefore, if after build-up of the gas pressure the setting means is disconnected, the rotary nozzle body 3-2 continues to rotate until the radial slits 31-2 again communicate with the outlet slits 32-2 and the gas can pass into the open. At this moment the tensioning force on the rotary nozzle body 3-2 becomes active again, so that frictional engagement is established again between the friction faces 11-2 and 12-2.

The step width of this drive for the rotary nozzle body is determined, as has been mentioned, by the geometric correlation of the radial slits 31-2 and outlet slits 32-2. For a small step width there may be provided, e.g., a geometric correlation on the vernier principle.

In the two embodiments shown, the end positions of the rotary nozzle body need practically not be readjusted. However, it is, of course, possible to do so on the basis of the signals of the angle transmitter.

FIG. 2 also indicates the possibility of closing the outlet openings 32-2, e.g., with the aid of a rotary valve 33-2, to obtain the above-mentioned pre-control effect.

Figure 4:
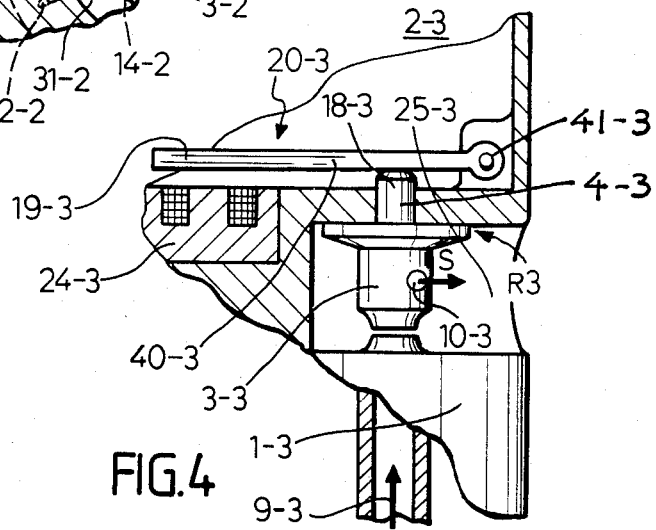
FIG. 4 is a schematic representation of another embodiment of a brake and release device according to the invention with an electromagnetic lever drive as the setting means.

In FIG. 4, a part of a shell 1-3 with an additional thrust nozzle system 2-3 is illustrated, whose rotary nozzle body 3-3 and friction coupling R3 are constructed as in the embodiment according to FIG. 1. On the upper rounded portion of the neck portion 4-3, serving as thrust/pivot bearing 18-3, there acts a one-armed lever 40-3 whose pivot point 41-3 lies near the outside wall of the shell. At least the free end of lever 40-3 is formed as a magnet armature 19-3, a magnet coil 24-3 being associated with this armature. The lever and magnet coil together form the setting means 20-3.

With this design, the required control magnet force is reduced by the relatively large lever arm. If the thrust nozzle system 2-3 is operated with hot gas, this has the advantage that the magnets are relatively far removed from the hot parts. Due to this design, the thrust nozzle 10-3 of the rotary nozzle body 3-3 can be accommodated close to the barrel wall, owing to which the thrust jet S can be utilized excellently. Because of the greater space requirement for the setting means due to the one-armed lever, this design can be used preferably for missiles of relatively large caliber. It is possible, for instance, to provide several synchronously rotating thrust nozzles at the circumference of the missile, the setting means of which are actuated from a single electromagnet with the one-armed lever for each.

Figure 6:
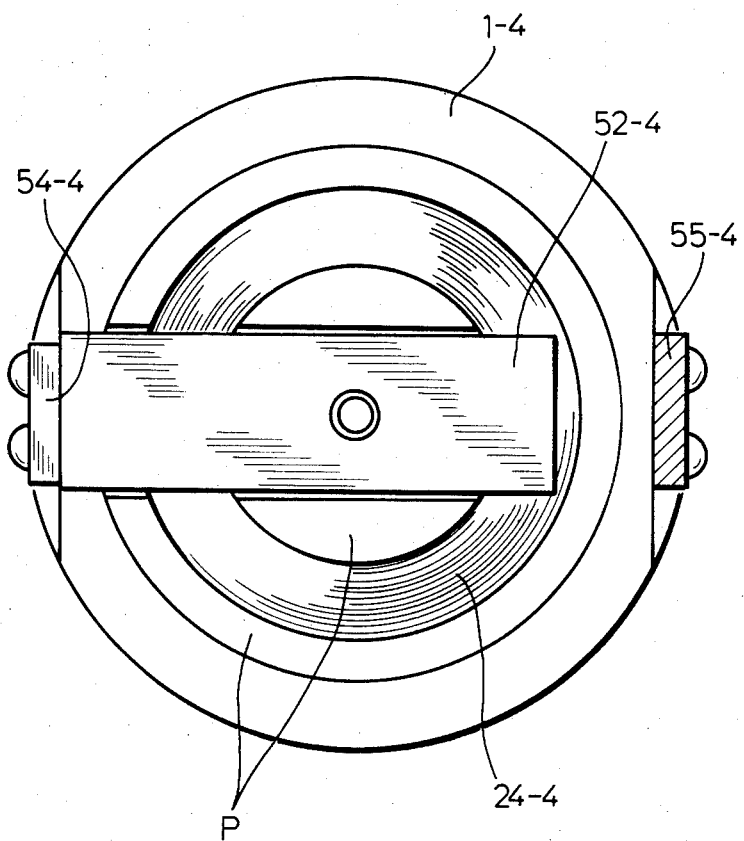
FIG. 6 is a top view of the embodiment according to FIG. 5.

The thrust nozzle system 2-4 shown in FIGS. 5 and 6 again resembles that in FIG. 1, as far as the rotary nozzle body 3-4 is concerned. In this embodiment, the friction coupling R4 operates during release of the rotary nozzle body with supporting gas pressure, which is built up in the annular space 13-4, 15-4 between the friction faces 11-4 and 12-4. The neck portion 4-4 of the rotary nozzle body 3-4 is mounted in a bearing sleeve 5-4 and is connected with a shaft 16-4 for an angle transmitter not shown. A slide ring 50-4 slides on the upper flat ground surface still lying inside the sliding sleeve 5-4, on which rests by its lower somewhat sharp-edged end, pressure sleeve 51-4 surrounding the shaft 16-4. The pressure sleeve, sliding ring and ground top side of the rotary nozzle body jointly form a thrust pivot bearing 18-4.

The setting means 20-4, acting on this thrust pivot bearing 18-4, comprises a folded lever arrangement 40-4 of two levers 52-4 and 53-4. In this case the two levers 52-4 and 53-4 extend approximately over the entire caliber diameter of the shell 1-4. The first lever 52-4 is connected at its narrow side with a spring strip 54-4, which in turn is fastened to the outer wall of the shell. Lever 52-4 embraces shaft 16-4 and rests on the pressure sleeve 51-4. The other end of the beam type lever 52-4 is free. At this housing wall toward the free end, the second lever 53-4 is attached to the wall of the shell 1-4 again with a spring strip 55-4. This lever 53-4 serves as magnet armature 19-4 for an electromagnet with an annular magnet coil 24-4, and likewise annular poles P, which extend beyond the first lever 52-4, so that the magnetic force can act on the second lever 53-4. The second lever 53-4, above the first lever, surrounds also the shaft 16-4 and is retained on the wall of the shell 1-4 by its free end opposite the spring strip 54-4, by means of a clamping piece 56-4. Between the poles P and the bottom side of lever 53-4 an air gap L occurs. It can be varied if the clamping piece 56-4 is adjustable. In the second lever 53-4, above the free end of the first lever 52-4, an adjusting screw 57-4 is screwed in, which presses on the free end of the first lever 52-4. With this screw, the force with which lever 52-4 acts on the pressure sleeve 51-4 when the magnet coil is disconnected can be adjusted. This screw, therefore, serves to influence the total tensioning force acting on the rotary nozzle body 3-4.

Due to the spring strips 54-4 and 55-4, the two levers can be pivoted about axes 58-4 and 59-4, respectively, perpendicular to their longitudinal direction. If, therefore, the magnet coil is connected, the second lever 53-4 is attracted by the magnet coil and is able to rotate about the axis 59-4. Thereby the free end of the fist lever 52-4 is pushed downward via the adjusting screw 57-4, this first lever pivoting about the axis 58-4. Thereby a force is exerted on the pressure sleeve 51-4 which is opposed to the adjusted tensioning force and overcomes it, so that the rotary nozzle body 3-4 is released for rotation. It should be noted, too, that with the connecting of the magnet coil practically no paths are traveled, but that the control of the rotary nozzle body occurs essentially through the exerted forces. In the case of the folded lever arrangement 40-4 shown in FIG. 5, the active lever arm is very large, so that one can operate with small coil currents. Due to the centered arrangement of the magnet coil and of the levers, this design also is highly miniaturizable.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly to be regarded in an illustrative rather than a restrictive sense.

What is claimed is:

1. Brake and release apparatus for a rotary nozzle body having a rotary shaft disposed in a missile casing and which for guiding the missile delivers a gas thrust jet substantially perpendicular to the direction of the axis of rotation, wherein for adjusting the thrust jet direction, friction coupling means is provided comprising first and second friction surface means, said first and second friction surface means being brought into and out of engagement with one another by setting means, the first friction surface means being disposed on the rotary nozzle body and the second friction surface means being disposed on the missile, wherein when said setting means is not actuated, the first friction surface means is held in frictional engagement against the second friction surface means by a tensioning force, said setting means acting on a rotary shaft of the rotary nozzle body through a thrust/pivot bearing means and providing an actuating force directed counter to the tensioning force.

2. The apparatus recited in claim 1, further comprising an annular space surrounding the axis of rotation of the rotary nozzle body in an abutment area of the two friction surface means which communicates with a propellant source means.

3. The apparatus recited in claim 2 wherein said propellant source means comprises gas generator means.

4. The apparatus recited in claim 2, wherein an active surface of the annular space and a pressure of the propellant from the propellant source means are rated so that when the setting means is not actuated, frictional engagement exists between the friction surfaces means.

5. The apparatus recited in claim 2, wherein the annular space is arranged in one of the friction surface means, and in certain rotational positions of the rotary nozzle body, communicates with outlet openings in the other friction surface means leading into open space, the active surface of the annular space and the propellant pressure being rated so that between the certain rotational positions of the rotary nozzle body the frictional engagement is released.

6. The apparatus recited in claim 5, wherein the annular space has at certain angle distances radially directed concavities, and the outlet openings are formed as radial slits which in the certain rotational positions are overlapped by the concavities at least in part.

7. The apparatus recited in claim 5, wherein the outlet openings are closable in a controlled manner.

8. The apparatus recited in claim 2, wherein the annular space is connected via a tap bore with a central bore in the rotary nozzle body, which bore communicates with said propellant source.

9. The apparatus recited in claim 1, wherein the setting means comprises an electromagnetically actuated setting means.

10. The apparatus recited in claim 9, wherein the setting means comprises a magnet armature acting directly on the thrust/pivot bearing means of the rotary nozzle body.

11. The apparatus recited in claim 9, wherein the setting means comprises an electromagnetically operable lever means.

12. The apparatus recited in claim 11, wherein the lever means comprises a lever having a free end, at least the free end being formed as a magnet armature of an electromagnet.

13. The apparatus recited in claim 11, wherein the lever means has two cooperating levers which are pivotably attached on opposite sides of the axis of rotation of the rotary nozzle body and are fitted together in the form of a V, the first lever acting on the thrust/pivot bearing means and being in contact at its free end located in the V tip with a tappet means disposed in the second lever fastened in the V tip, the free end of said second lever abutting against a clamping piece, and at least the second lever being formed as a magnet armature of an electromagnet.

14. The apparatus recited in claim 13, wherein the tappet means in the second lever comprises an adjusting screw.

15. The apparatus recited in claim 1, wherein the thrust/pivot bearing means between the rotary nozzle body and the setting means comprises sliding bearing means.

* * * * *